UNITED STATES PATENT OFFICE.

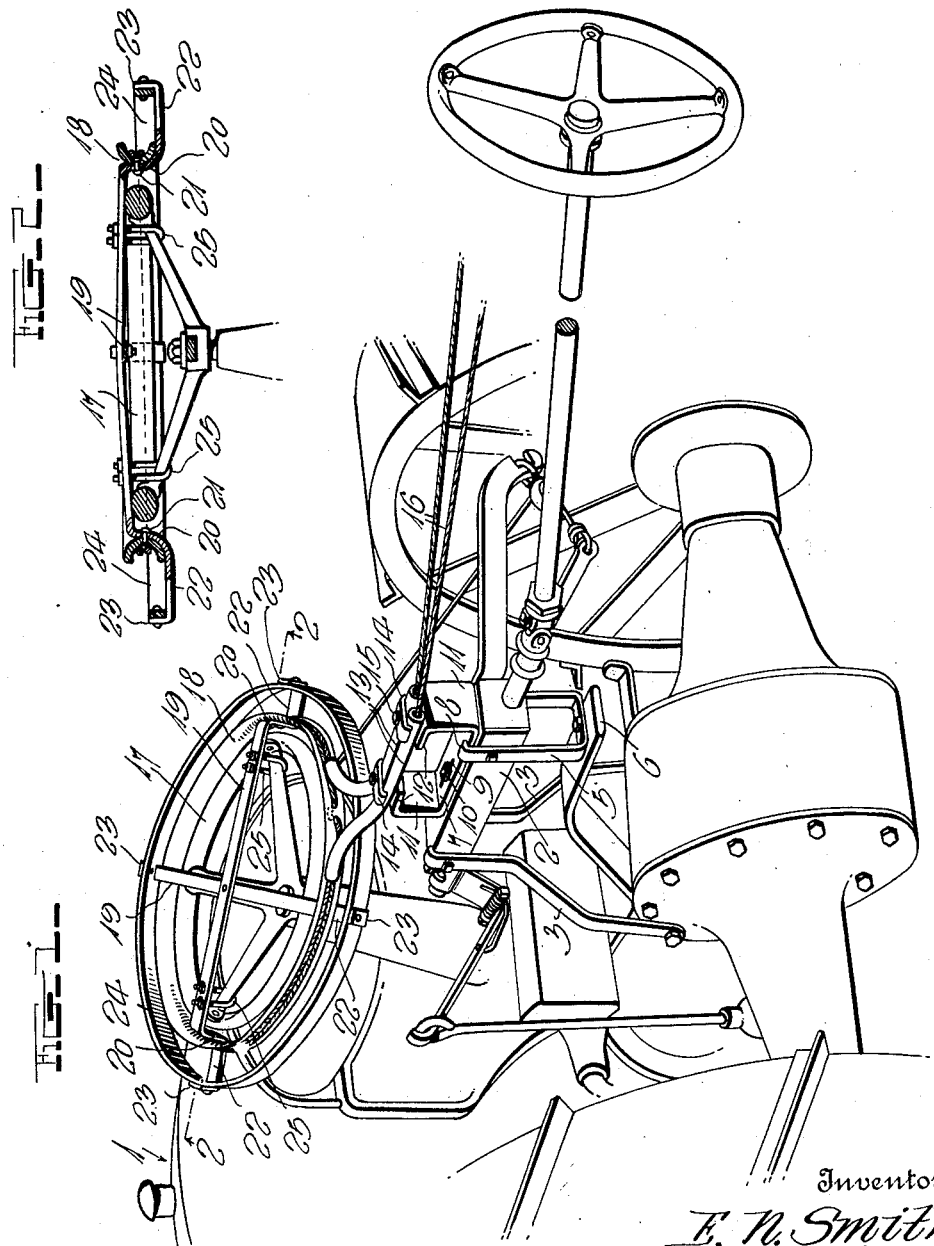

ERIC N. SMITH AND HERBERT H. DILLINGER, OF HOYTVILLE, OHIO.

STEERING MECHANISM FOR TRACTORS.

1,408,416.  Specification of Letters Patent.  Patented Feb. 28, 1922.

Application filed April 7, 1921. Serial No. 459,283.

*To all whom it may concern:*

Be it known that we, ERIC N. SMITH and HERBERT H. DILLINGER, citizens of the United States, residing at Hoytville, in the county of Wood and State of Ohio, have invented certain new and useful Improvements in Steering Mechanisms for Tractors; and we do declare the following to be a full, clear, and exact description of the invention, such as will enable others skilled in the art to which it appertains to make and use the same.

This invention relates to an improved steering mechanism for use in connection with a tractor so that the tractor may be steered by the operator of a vehicle or wheeled implement connected with the tractor thus making it unnecessary for the person steering the tractor to ride upon the tractor. This device is to be used in connection with a tractor having a control mechanism shown in connection with the companion application filed Feb. 21, 1921, Serial No. 446,815. It has been found that when in use, a tractor jolts and is very hard and disagreeable to rid and therefore the structure shown in this application and the companion application referred to above have been provided to permit the tractor to be controlled and steered by a person occupying the vehicle or wheeled implement drawn by the tractor.

This invention is illustrated in the accompanying drawings, wherein:

Figure 1 is a perspective view showing a tractor provided with the improved steering mechanism.

Figure 2 is a sectional view through the line carrying drum, the section being taken along the line 2—2 of Fig. 1.

This improved steering mechanism is used in connection with a tractor indicated in general by the numeral 1 and provided with control mechanism as shown in the companion application, Serial No. 446,815. This controlling mechanism which is not described in detail provides a supporting structure and includes a housing 2 carried by supporting legs 3 which are secured to the transmission housing and by means of a U-shaped yoke 5 secured to the spring arms 6 which ordinarily carry the driver's seat. A bracket 7 is placed upon the housing 2 and is engaged by the inturned fingers 8 at the upper ends of the arms of the yoke 5. This bracket is further provided with a longitudinally extending slot 9 through which extends the securing bolt 10 carried by the upper wall of the housing 2 so that when the securing bolt 10 is released, the bracket can be moved longitudinally of the housing, and then secured in the adjusted position by again tightening the bolt. This bracket 7 has its arms 11 carried upwardly and then bent inwardly to provide supporting feet 12 upon which will rest the tubular line guides 13. These tubular line guides are engaged by the clamps 14 which are secured to the seat 12 by bolts 15 and it will thus be seen that by loosening the bolts 15, the tubular guides can be released and thus entirely removed or adjusted longitudinally of the bracket and then again secured by tightening the bolts. The forward end portions of these tubular guides are bent to extend in diverging relation and in the preferred form, these tubular guides or pipes will be formed of some material which will permit them to be bent to extend in diverging relation at an angle which will guide the end portions 16 of the steering lines in the most effective manner.

The tractor is provided with a steering wheel 17 and a drum will be secured to this steering wheel as shown. This drum is provided with an inner rim or ring 18 which is curved in cross section as shown in Fig. 2 so that the steering line may have its central portion secured to the rim and its end portions passed about the rim in opposite directions and in crossed relation and then passed through the tubular lines or guiding pipes 13. It should be noted that when the device is in use, these pipes will be positioned with their forward end portions close to the rim and curved so that the end portions of the lines will pass freely through the guiding pipes onto or off the rim portion of the drum. Cross strips 19 which resemble spokes extend across the space within the rim 18 and have their end portions bent downwardly as shown at 20 and secured to the inner face of the rim by rivets or other suitable fasteners 21. The end portions of the strips 19 are then carried outwardly beyond the rim 18 as shown at 22 and have their end portions bent upwardly to provide fingers 23 which will be secured upon the outer face of a ring 24 positioned in spaced relation about the line carrying rim 18. The curved forward end portions of the pipes 13 extend over this ring 24 and the ring will thus provide supporting means for the forward end portions of these pipes in case they should have any tendency to drop downwardly. It should be further noted that the portions 22 of the strips 19 will serve to engage the portion of the steering line about the rim 18 and prevent it from falling down out of place, in case it should become slackened and slip off of the rim 18. Therefore, if the lines are released and the portions of the steering lines about the rim should slip off of the same, this portion will be supported and will move back onto the rim when the lines are again tightened. This drum will be put in place as shown and will be secured to the steering wheel in any suitable manner, U-bolts 25 being employed in the present instant and engaging the spokes of the wheel 17. The present disclosure illustrates one form of line carrying drum and it is to be understood that other forms may be substituted for the specific structure shown and further that if desired, the line carrying drum could be directly connected with the steering post instead of being connected with a steering wheel carried by the post.

We claim:

1. A steering mechanism comprising a supporting structure to be mounted to the rear of a steering wheel, tubular guides carried by said supporting structure and having their forward end portions extending in diverging relation for extending circumferentially of a steering wheel, the tubular guides being adapted to receive the end portions of a steering line having its intermediate portion passed about a steering wheel in front of said bracket.

2. A steering mechanism comprising a supporting structure, a bracket carried by and adjustable longitudinally of said supporting structure, tubular guides carried by said bracket and having their forward end portions extending in diverging relation and forming guides for the end portions of a steering line having its intermediate portion passed about a steering wheel in front of said bracket.

3. The structure of claim 2 having the tubular guides releasably secured upon the bracket and movable longitudinally of the bracket when released.

4. A steering mechanism comprising a supporting structure, a bracket carried by and adjustable longitudinally of the supporting structure and having upstanding arms bent to provide heads, tubular guides secured to the heads of the bracket and extending longitudinally of said bracket and having their forward end portions extending in diverging relation, and a steering line for passing around a steering wheel having its end portions passing through the tubular guides and extended rearwardly.

5. The combination with a vehicle including a steering wheel, of wheel controlling mechanism including an auxiliary wheel carried by said steering wheel and including an inner steering line carrying rim and an outer rim held in spaced relation to the inner rim, a supporting structure mounted to the rear of the steering wheel, and tubular steering line guides carried by said supporting structure and having their forward end portions extending across said outer rim and terminating adjacent said inner rim.

6. The combination with a vehicle including a steering wheel, of wheel control mechanism including an auxiliary wheel carried by said steering wheel and constituting a steering line drum, a supporting structure carried by the tractor to the rear of the steering wheel, and tubular steering line guides carried by the supporting structure and having their forward end portions extending in diverging relation with their forward ends adjacent the drum.

7. The combination with a vehicle including a steering wheel, of wheel control mechanism including a steering line drum carried by said steering wheel, a supporting structure adjacent said steering wheel, and tubular steering line guides carried by the supporting structure and extending radially of the drum and terminating adjacent the drum to receive end portions of a steering line passed about the drum.

8. The structure of claim 7 having the supporting structure including a bracket for carrying the tubular line guides adjustably mounted for movement towards and away from the drum.

9. The structure of claim 7 having the supporting structure including a bracket for carrying the tubular line guides adjustably mounted for movement towards and away from the drum, and clamps releasably holding the guides in engagement with the bracket.

10. A steering mechanism of the character described including a drum comprising a line carrying rim, an outer ring about said rim, and strips extending in crossed relation and having their end portions bent to extend down beneath the rim and outwardly to engage said ring, the bent end portions being secured to the rim and ring and the intermediate portions being adapted for connection with a steering wheel.

11. A steering mechanism of the character described including a line carrying ring, an outer ring, and strips having their intermediate portions extending across space enclosed by said line carrying ring and their end portions connected with the rings and extending across space between the rings, and means for securing the drum in operative relation to a steering wheel.

In testimony whereof we have hereunto set our hands.

ERIC N. SMITH,
HERBERT H. DILLINGER.